United States Patent [19]
Shiue

[11] Patent Number: 5,262,996
[45] Date of Patent: Nov. 16, 1993

[54] FIFO MODULE

[75] Inventor: Tzong-Liang Shiue, Tainan, Taiwan

[73] Assignee: Industrial Technology Research Institute, Hsinchu, Taiwan

[21] Appl. No.: 750,641

[22] Filed: Aug. 27, 1991

[51] Int. Cl.$^5$ .............................................. G11C 7/00
[52] U.S. Cl. ..................................... 365/221; 365/78; 365/233.5
[58] Field of Search ...................... 365/78, 221, 189.12, 365/189.08, 189.05, 233.5

[56] References Cited

U.S. PATENT DOCUMENTS

| | | | |
|---|---|---|---|
| 4,592,019 | 5/1986 | Huang et al. | 365/78 |
| 4,751,675 | 6/1988 | Knauer | 365/78 |
| 4,829,475 | 5/1989 | Ward et al. | 365/78 |
| 4,839,866 | 6/1989 | Ward et al. | 365/221 |

Primary Examiner—Joseph A. Popek
Attorney, Agent, or Firm—Meltzer, Lippe, Goldstein et al.

[57] ABSTRACT

A FIFO is formed from a plurality of modules each of which comprises a memory section and a control section. A FIFO of arbitrary size can be constructed simply by connecting a desired number of modules. The control section of each module is simple and efficient and enables a FIFO to be easily implemented as part of an integrated circuit. The control section of each module comprises four flip-flops for outputting a write pointer, a read pointer, an EMPTY* flag and a FULL* flag, which flags enable the control section of a module to determine if the FIFO as a whole is empty or full.

13 Claims, 7 Drawing Sheets

M: MEMORY UNIT
C: CONTROL UNIT

| 5A | 5B |
|---|---|
| 5C | 5D |

FIFO MODULE

FIELD OF THE INVENTION

The present invention relates to a FIFO which is formed from a plurality of individual FIFO modules. Each module comprises a data storage section and a control section. The control section is designed so that a FIFO of arbitrary size can be formed by connecting a desired number of modules.

BACKGROUND OF THE INVENTION

In many kinds of integrated circuits, particularly in those related to communications, there is a constant need to use FIFOs. In most cases, a FIFO is utilized to perform a buffering function. For example, in an integrated circuit, a FIFO can be used to buffer data that is being transmitted between two different circuit units controlled by two asynchronous clocking signals.

Similarly, if an integrated circuit is interfaced with an external microcomputer, data can be stored in a FIFO until there is a sufficient accumulation of data to start a continuous transmission of data between the integrated circuit and the microcomputer. Advantageously, this reduces the need for the microcomputer to execute an interrupt process in receiving data from the integrated circuit.

A conventional FIFO 10 is illustrated in FIG. 1. The FIFO 10 of FIG. 1 contains a data storage unit for storing a certain amount of data. Data to be written into the FIFO 10 is represented by DATAIN. Data is written into the FIFO 10 under the control of a clock signal CKIN. Data which is read out of the FIFO is represented by DATAOUT. Data is read out of the FIFO 10 under the control of a clock signal CKOUT. When the FIFO 10 is full and no more data can be written into it, a FULL Signal is generated. Similarly, when all of the data stored in the FIFO 10 is read out, an EMPTY signal is generated.

The internal design of the FIFO 10 of FIG. 1 is schematically illustrated in FIG. 2. As illustrated in FIG. 2, the FIFO 10 comprises a memory section 12 and a centralized control unit 14. The memory section 12 comprises a plurality of regularly arranged memory units 16. The control unit 14 controls the writing of data into and the reading of data out of the memory units 16 in response to the clock signals CKIN and CKOUT. The control unit 14 also generates the FULL and EMPTY signals when the memory units 16 are all FULL or all EMPTY.

When a FIFO is incorporated into an integrated circuit, the design of a central control unit is often a major undertaking. In particular, a separate design of the central control unit must usually be made for each FIFO of different size (i.e. different data storage capacity). In addition, because the centralized control unit is not modular, extra layout effort is required for an integrated circuit implementation.

One possible approach to this problem is modularization (see, e.g., Ward et al, U.S. Pat. No. 4,839,866 and Huang et al, U.S. Pat. No. 4,592,019). In particular, it would be highly advantageous if FIFO modules comprising a modular memory section and a modular control section could be devised so that a FIFO of arbitrary size could be produced simply by connecting the appropriate number of modules. It is an object of the present invention to provide such FIFO modules. It is a further object of the invention to provide such FIFO modules with a simple and efficient distributed control section that is especially easy to implement in an integrated circuit.

SUMMARY OF THE INVENTION

In accordance with an illustrative embodiment of the invention, a FIFO comprises a plurality of FIFO modules arranged in sequence. Each FIFO module comprises a memory section for storing a plurality of data bytes and a control section.

In a preferred embodiment of the invention, the control section of each module comprises four flip-flops for generating four signals which can take on the value logic 1 or logic 0. These flip-flops are a write pointer (WP) flip-flop for generating a write pointer, a read pointer (RP) flip-flop for generating a read pointer, a flip-flop for generating a FULL* flag which is set when a particular module determines that the entire FIFO is full, and a flip-flop for generating an EMPTY* flag which is utilized when a particular module determines that the entire FIFO is empty.

As used herein the symbols $WP_i$ and $RP_i$ designate the write pointer and read pointer flip-flops of the $i^{th}$ module in the FIFO, or the write pointer and read pointer signals outputted by the write pointer and read pointer flip-flops, depending on the context.

The WP flip-flops in each of the modules are connected in a ring. In a FIFO with modules i, i=0,1, ... ,N, an output of the WP0 flip-flop (i.e., the write pointer flip-flop of module i=0) is connected to an input of the WP1 flip-flop (i.e. the write pointer flip-flop of module i=1). Similarly, an output of the WP1 flip-flop is connected to an input of the WP2 flip-flop (i.e. the write pointer flip-flop of the module i-1). In addition, an output of the WPN flip-flop (i.e. the write pointer flip-flop of the module i=N) is connected to an input of the WP0 flip-flop. The RP flip-flops in each of the modules are connected in a similar ring.

Only one WP flip-flop and only one RP flip-flop can be set logic 1 at a given time. When $WP_i$ of a particular module i is logic 1, data can be written into the associated memory section. When this write operation is completed, the write pointer flip-flop $WP_i$ in the module i changes its state from 1→0 and the write pointer flip-flop $WP_{i+1}$ of the module i+1 changes its state from 0→1 so that the next write operation writes data into the module i+1. Similarly, when the read pointer flip-flop $RP_i$ of a particular module i is logic 1, data can be read out of the associated memory section. When this read operation is completed, $RP_i$ changes its state from 1→0 and the read pointer flip-flop $RP_{i+1}$ of the module i+1 changes its state 0→1 so that the next read operation reads data out of the module i+1.

In the foregoing manner, a logic 1 write pointer signal propagates around the ring of WP flip-flops so that successive data write operations take place in successive modules. In addition, a logic 1 read pointer signal propagates around the ring of RP flip-flops so that successive data read operations take place in successive modes. However, the read and write operations take place in an entirely asynchronous manner. In addition, only one WP flip-flop and only one RP flip-flop can be set to logic 1 at any given time.

The situation can arise where for a given module i, $RP_i$ and $WP_i$ can be logic "1" at the same time. If the last operation was a read operation, it means all the data in the FIFO have been read and the FIFO as a whole is empty. On the other hand, if the last operation was a write operation, it means the FIFO as a whole is full. To distinguish between these two situations, the control section of each module includes the FULL* and EMPTY* flip-flops for storing FULL* and EMPTY* flags. When the EMPTY* flag of any module is asserted, the FIFO as a whole is empty. When the FULL* flag of any module is asserted, the FIFO as a whole is full.

In any module i, when WPi makes a transition 0→1, the value of FULL* is obtained by latching RPi. If at this time RPi is 1, then FULL* is 1, indicating that the write pointer has moved around the FIFO and caught up with the read pointer and therefore the FIFO is full. This condition is resolved when another read operation takes place, at which time RPi undergoes a transition from 1→0 and FULL* of the module i is reset to 0. Similarly in the module i, when RPi makes a transition 0→1, the value of EMPTY* can be obtained by latching the write pointer signal WPi of this module. If at this time the WPi is 1, then EMPTY* = 1, indicating that the read pointer has moved around the FIFO and caught up to the write pointer, indicating that the FIFO as a whole is empty. This condition is resolved at the next write operation when WPi undergoes a transition from 1→0 and EMPTY* is then reset to 0.

In short, a FIFO which is formed from a plurality of FIFO modules is disclosed. The control structure of the FIFO is distributed among the individual modules. The modular nature of the control section of each modules allows a FIFO of arbitrary size to be constructed by connecting a desired number of modules. The control section of each module is simple and efficient and well suited for implementation in an integrated circuit.

DETAILED DESCRIPTION OF THE INVENTION

Figure 1:
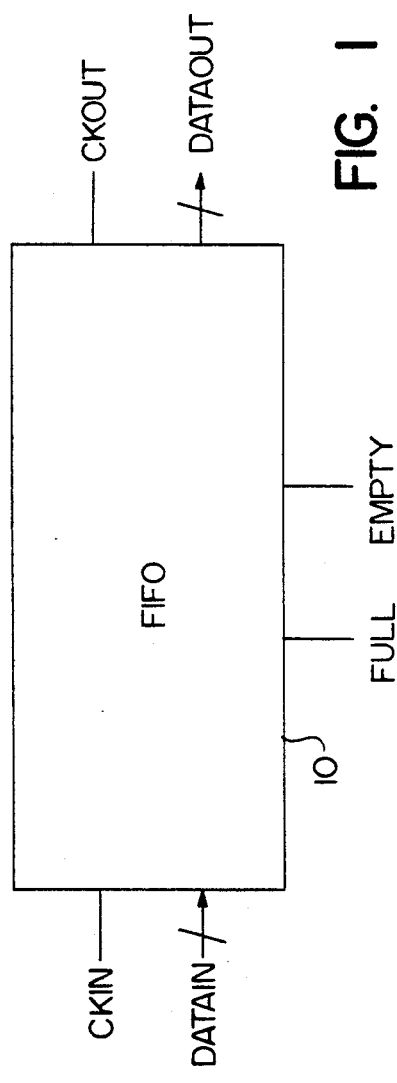
FIG. 1 and FIG. 2 schematically illustrate a conventional FIFO.
Figure 2:
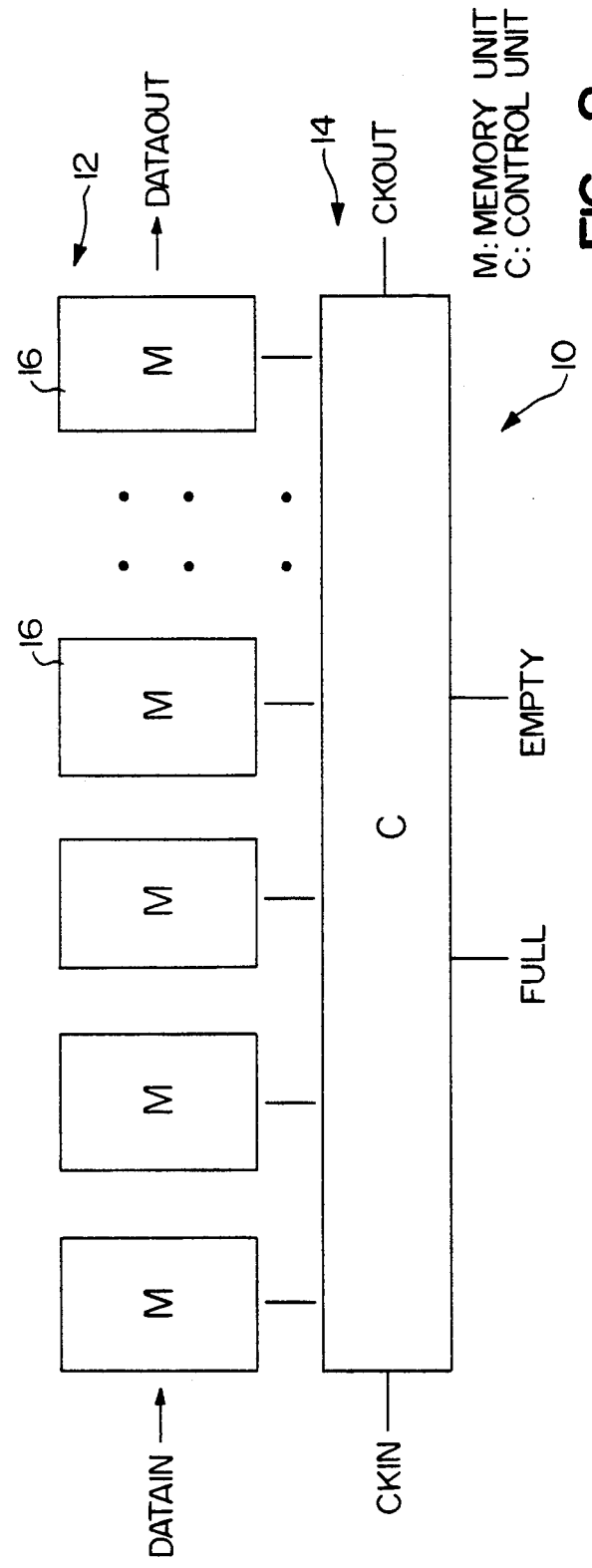
Figure 3:
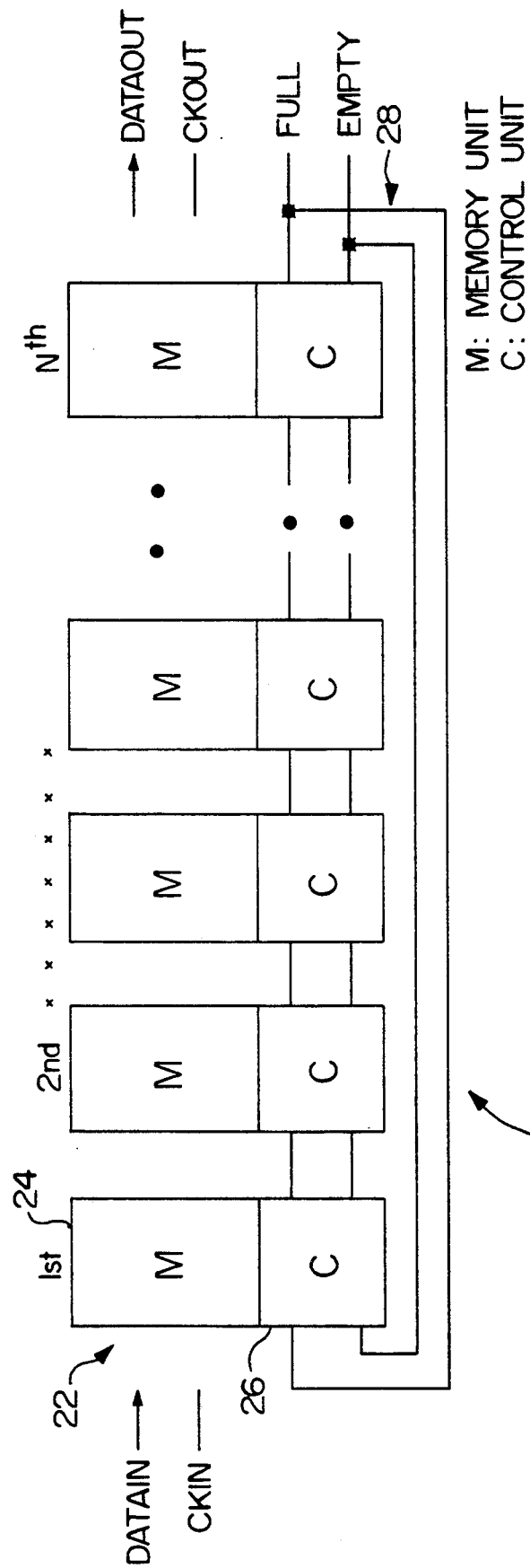
FIG. 3 schematically illustrates in block diagram form a FIFO formed from a plurality of FIFO modules, in accordance with an illustrative embodiment of the present invention.

FIG. 3 illustrates a FIFO 20 formed from a plurality of modules 22. The modules 22 are labeled 0,1, . . . ,N. Each module 22 comprises a memory section 24 for storing data and a control section 26. The control section 26 controls the writing of data into and the reading of data out of the corresponding memory section 24. DATAIN represents data that is written into the memory sections 24 with a timing determined by the clock signal CKIN. DATAOUT represents data that is read out of the memory sections 24 with a timing determined by the clock signal CKOUT.

The control sections 26 of the modules 0,1, . . . ,N cooperate in a manner discussed in detail below to form a control unit 28 for the entire FIFO structure. In particular, as shown in FIG. 3, the control sections 26 are connected into a ring to form the control unit 28. The control unit 28 outputs FULL and EMPTY signals for indicating if the FIFO 20 as a whole is full or empty.

Figure 4:
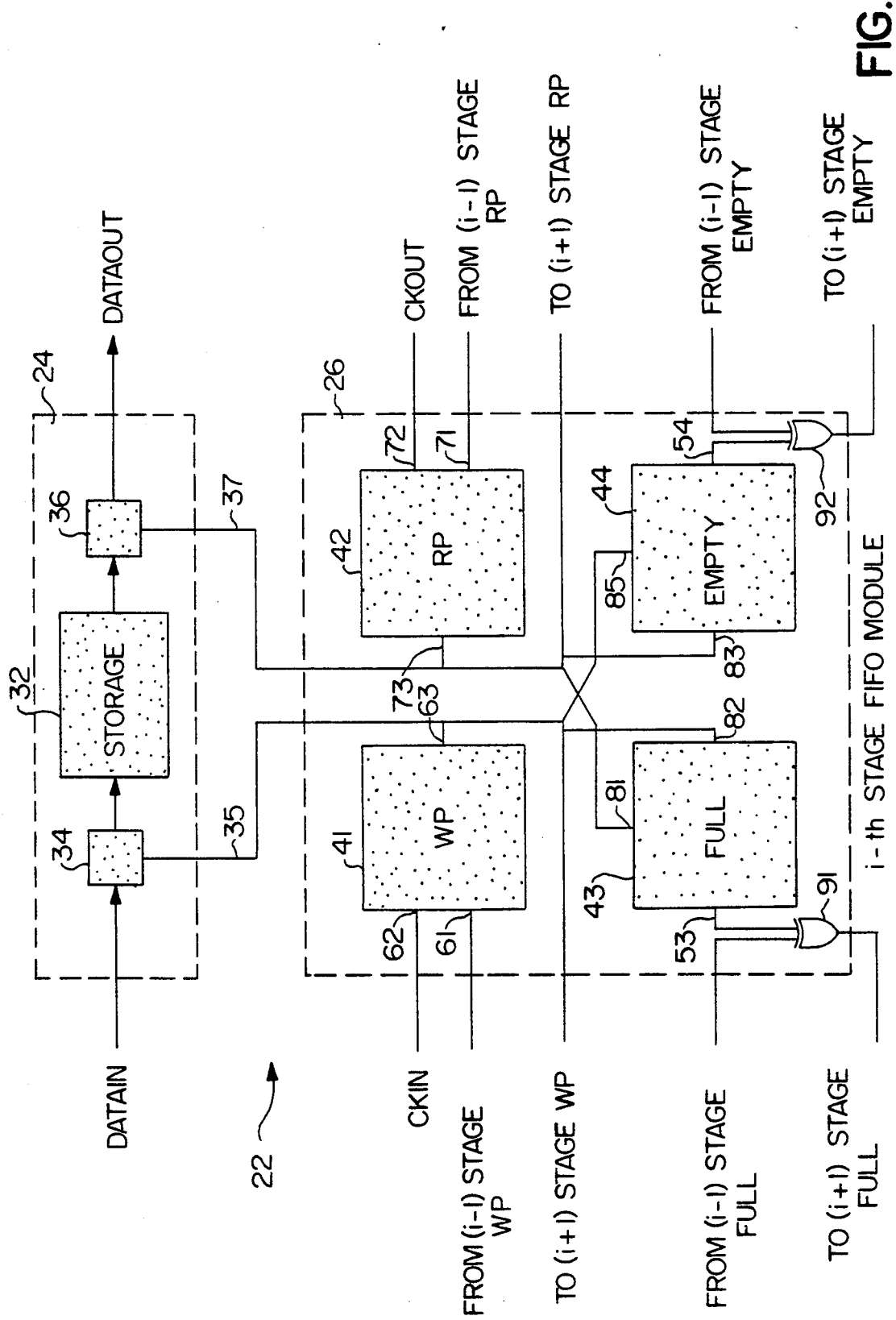
FIG. 4 illustrates one of the modules used to form the FIFO of FIG. 3.

FIG. 4 schematically illustrates a module 22 which forms the $i^{th}$ stage of the FIFO 20 of FIG. 3. The module 22 of FIG. 4 comprises a memory section 24 and a control section 26. The memory section 24 comprises a storage unit 32, a first gate unit 34, and a second gate unit 36. When a write pointer signal is applied via line 35 to the gate unit 34, data represented by DATAIN is written into the storage unit 32. When a read pointer signal is applied via line 37 to the gate unit 36, data represented by DATAOUT is read out of the storage unit 32.

The control section 26 of the module i comprises a write pointer flip-flop (WPi) 41 for outputting a write pointer signal on line 35, a read pointer flip-flop (RPi) 42 for outputting a read pointer signal on line 37, a FULL* flip-flop 43 for setting a FULL* flag on line 53 when the FIFO as a whole is full, and an EMPTY* flip-flop 44 for setting an EMPTY* flag on line 54 when the FIFO as a whole is empty.

The WP flip-flops of all the modules in the FIFO are connected in a ring. A logic 1 write pointer signal is passed from WP flip-flop to WP flip-flop along this ring so that only one WP flip-flop is set to logic 1 at any given time and so that only one storage unit 32 is enabled to receive data at any given time. By passing the WP signal around the ring of WP flip-flops in this manner, data is written into the memory modules 24 in sequence. To form this ring, the flip-flop 41 in the module i has an input 61 which is connected to the output of the flip-flop WPi−1 in the module i−1 and an output 63 which, in addition to being connected to the gate unit 34 via line 35, is also connected to the flip-flop WPi+1 in the module i+1. The flip-flop 41 also has an input 62 for receiving the write clock CKIN.

The RP flip-flops of all the modules in the FIFO are also connected in a ring. A logic 1 read pointer signal is passed from RP flip-flop to RP flip-flop along this ring so that only one RP flip-flop is set to logic 1 at any given time and so that only one storage unit 32 is enabled to read out data at any given time. By passing the RP signal around the ring of RP flip-flops in this manner, data is read out of the memory modules 24 in sequence. To form this ring, the flip-flop 42 in stage i has an input 71 which is connected to the output of the flip-flop RPi−1 in the module i−1 and an output 73, which in addition to being connected to the gate unit 36 via line 37, is also connected to the RP flip-flop in the module i+1. The flip-flop 43 also has an input 72 for receiving the read clock CKOUT.

In some cases, both the write pointer flip-flop 41 and the read pointer flip-flop 42 of the module i of FIG. 4 are set to logic 1 at the same time. This means that the FIFO as a whole is either completely full or completely empty. If the last operation was a read operation, it means all the data in the FIFO have been read and the FIFO as a whole is empty. On the other hand, if the last operation was a write operation, it means the FIFO as a whole is full. To distinguish between these two situations, the control section 26 of the module i of FIG. 4 includes the FULL and EMPTY* flip-flops 43 and 44 for storing FULL* and EMPTY* flags. When the EMPTY* flag of the module i is asserted, the FIFO as a whole is empty. When the FULL* flag of the module i is asserted, the FIFO as a whole is full.

In the module i, when WPi makes a transition 0→1 as indicated at the input 82 of the FULL* flip-flop 43, the value of FULL* is obtained by latching into the FULL* flip-flop 43, the output of read pointer flip-flop 42 via the input 81. If at this time the read pointer flip-flop 42 is in the logic state 1, then FULL* is 1, indicating that the write pointer has moved around the FIFO and caught up with the read pointer and therefore the FIFO is full. This condition is resolved when another read operation takes place, at which time the RP flip-flop 42 undergoes a transition from 1→0 and FULL* of the module i is reset to 0. Similarly in the module i, when RPi makes a transition 0→1 as indicated at the input 83 of the EMPTY* flip-flop 44, the value of the EMPTY* flip-flop 44 can be obtained by latching the output of the WPi flip-flop 41 into the flip-flop 44 via the input 85. If at this time the write pointer is 1, then EMPTY*=1, indicating that the read pointer has moved around the FIFO and caught up to the write pointer, indicating that the FIFO as a whole is empty. This condition is resolved at the next write operation when the WPi flip-flop undergoes a transition from 1→0 and EMPTY* is then reset to 0.

The FULL* flag at the output 53 of the flip-flop 43 in the module i is combined with the FULL* flag from the module i−1 using the EXCLUSIVE-OR (X-OR) gate 91. The output of the gate 91 is connected to an input of a corresponding X-OR gate in the module i+1. Similarly, the EMPTY* flag at the output 54 of the flip-flop 44 in the module i is combined with the EMPTY* flag of the module i−1 using the X-OR gate 92. The output of the gate 92 is connected to an input of a corresponding X-OR gate in stage i+1.

Figures 5, 5A:
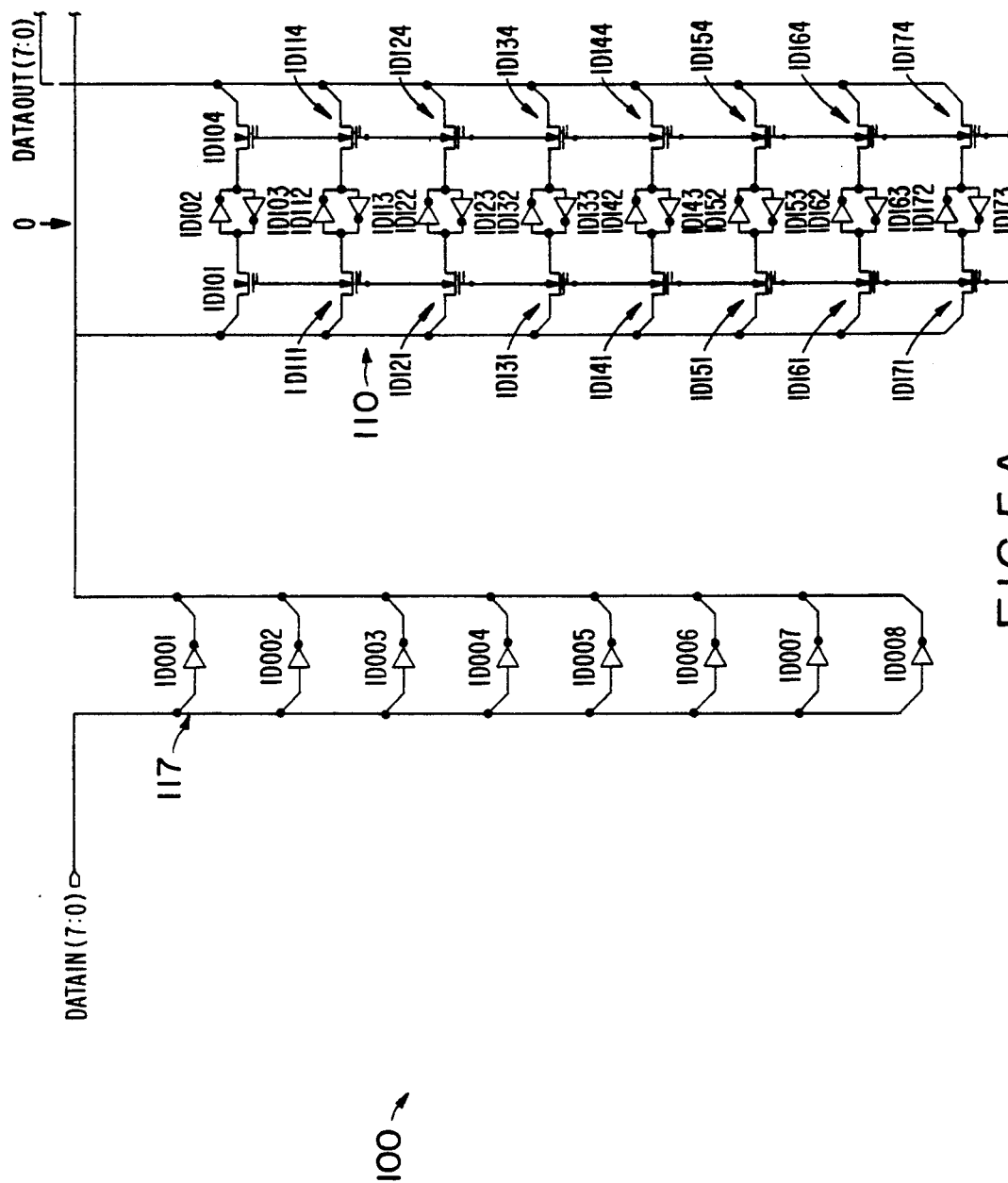
FIG. 5 is a key to the reconstruction of FIGS. 5A-5D which are, when combined, a more detailed circuit diagram of the FIFO of FIG. 3.
Figure 5B:
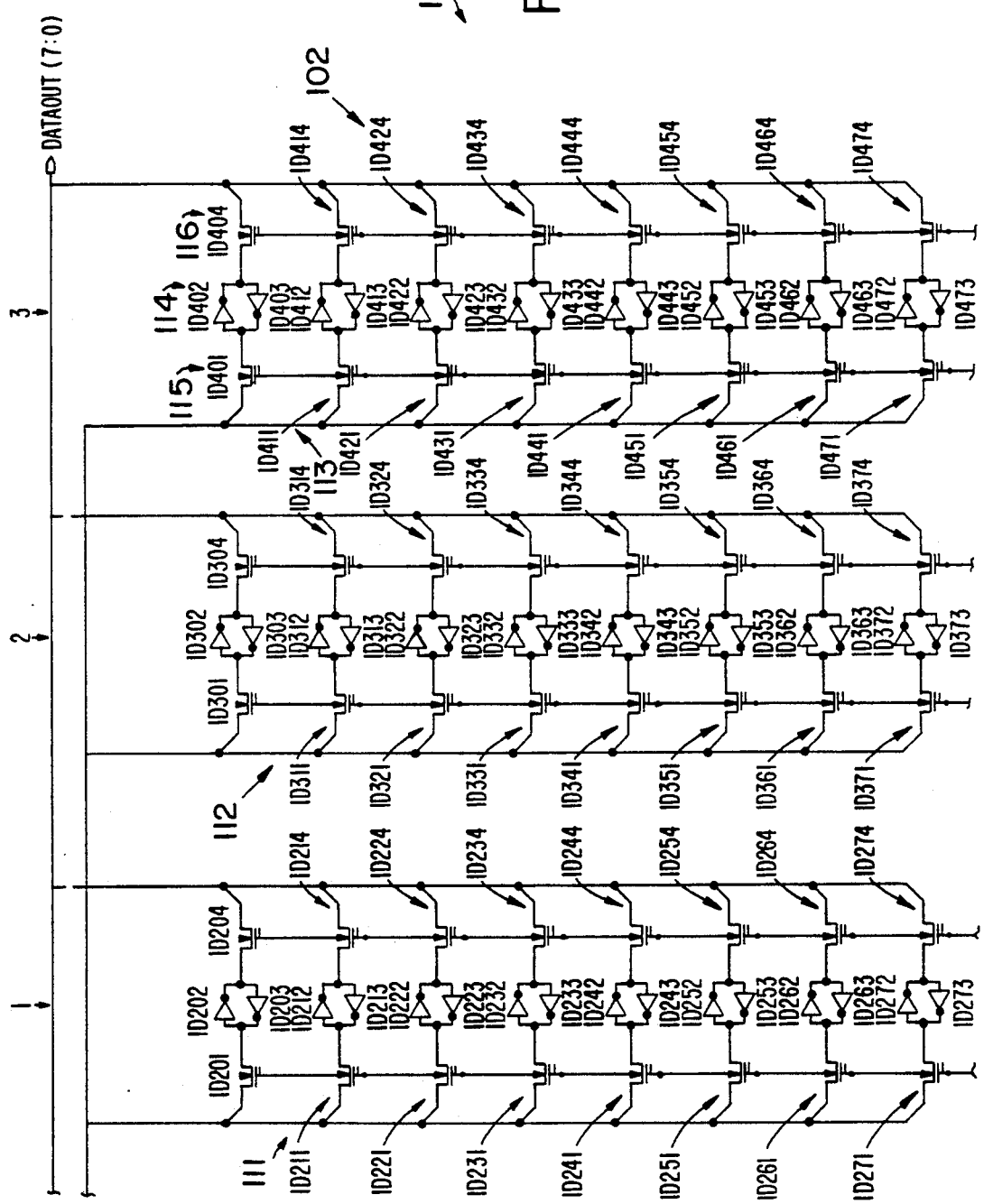
Figure 5C:
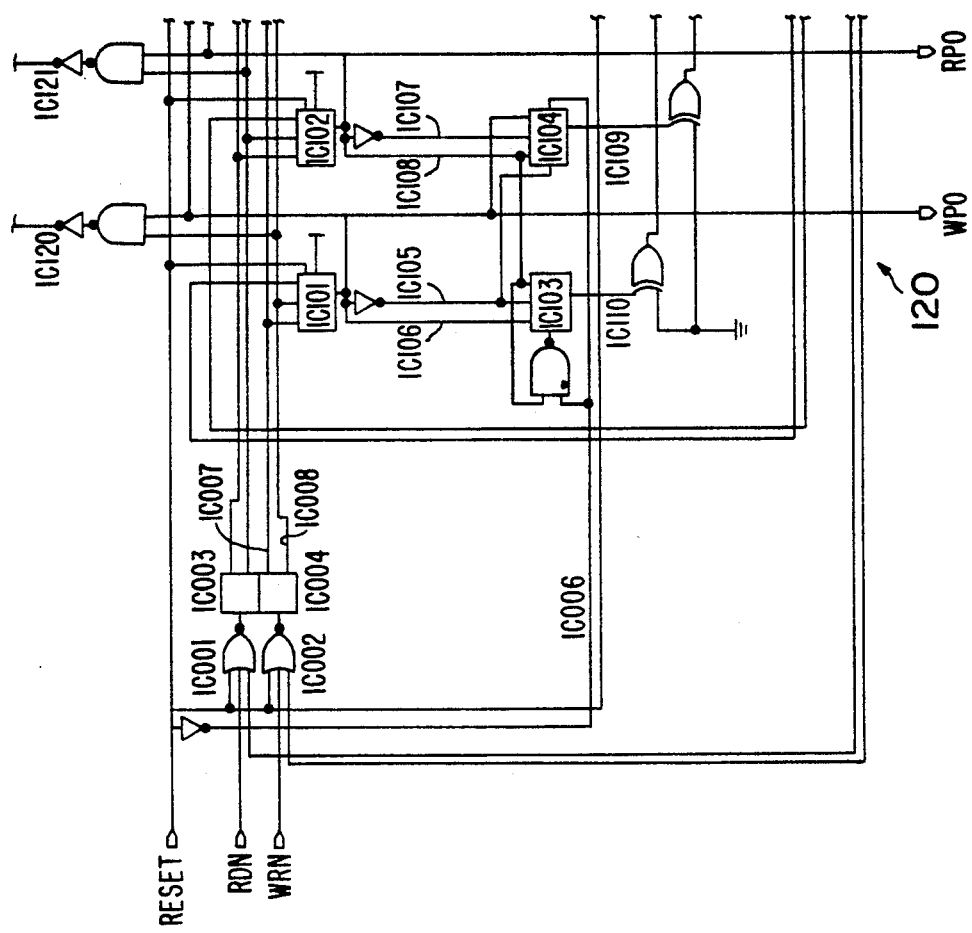
Figure 5D:
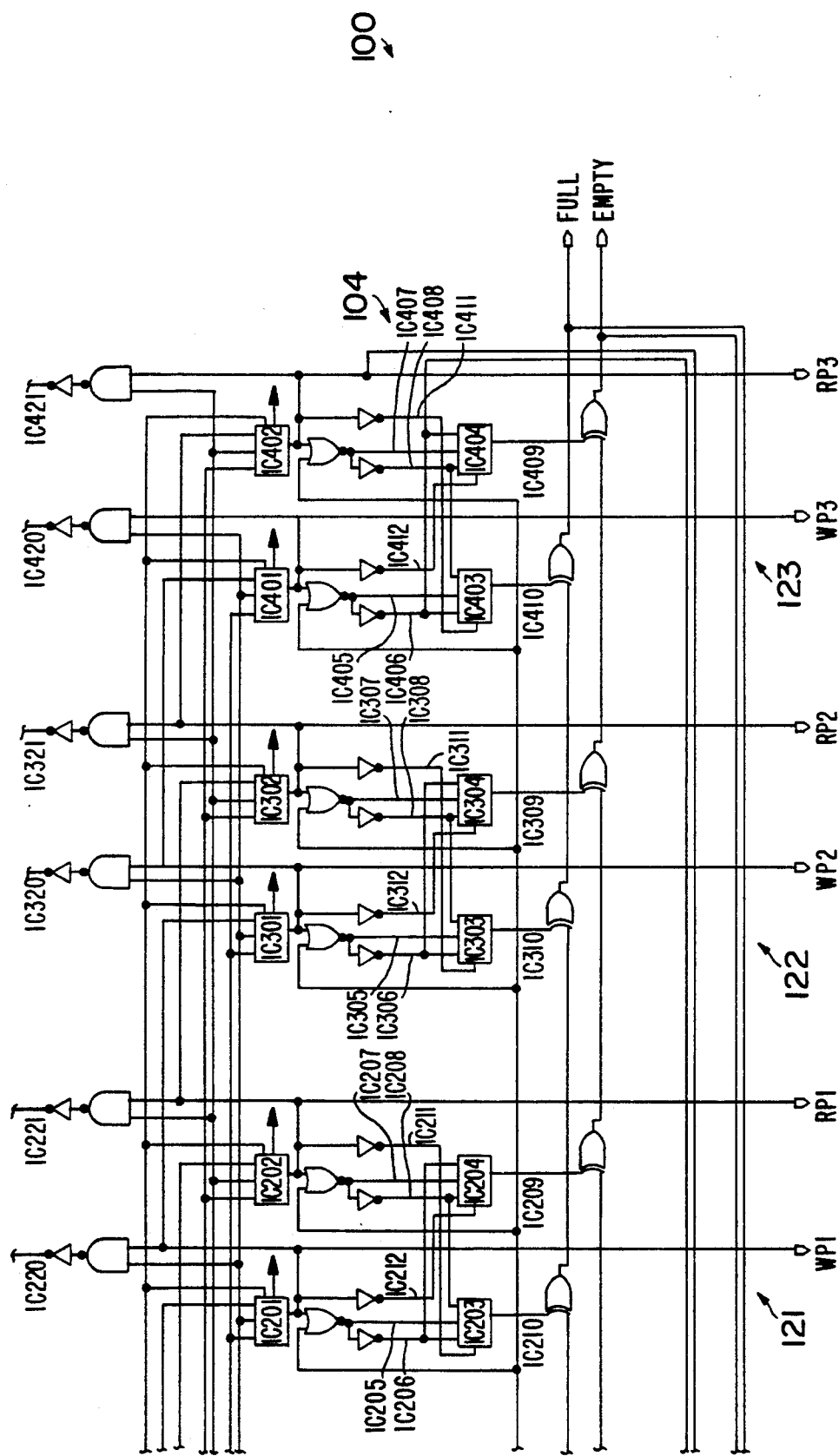

A FIFO unit in accordance with the present invention is illustrated in greater detail in FIG. 5.

The FIFO 100 of FIG. 5 can store four bytes of data. One byte of data is read or written for every read or write operation. The read and write operations take place in a completely asynchronous manner.

The upper portion 102 of the FIFO 100 of FIG. 5 is utilized for data input and output and comprises the components 1D001-1D474. The lower control portion 104 processes the control signals, i.e., read pointer, write pointer, EMPTY* and FULL* and comprises the components 1C001 to 1C411.

The FIFO 100 of FIG. 5 comprises four modules labeled 0,1,2,3. Each module comprises a memory section 110, 111, 112, 113 and a corresponding control section 120, 121, 122, 123. Each memory section includes storage for one byte of data. Thus, each memory section comprises eight one-bit storage elements 114 arranged in parallel. To write data into a storage element 114 in one of the modules the associated gate element 115 must be enabled by a write pointer. Similarly, to read data out of a storage element 114, the associated gate element 116 must be enabled by a read pointer signal. Because data is written and read in one byte units, all of the gates 114 or all of the gates 115 of a module are enabled in parallel. It should be noted that in the FIFO 100 of FIG. 5, the eight bits of data comprising a byte to be written into one of the memory sections 110, 111, 112, 113, are inverted by the eight inverters 117 arranged in parallel.

In FIG. 5, DATAIN (7:0) stands for a data byte to be written into the FIFO 100 and DATAOUT (7:0) stands for a data byte to be read out from the FIFO 100. The read and write operations are controlled by RDN and WRN signals, respectively, which are applied to the control section 104 of the FIFO 100. When WRN is logic 0, a byte of data of DATAIN (7:0) is written into the top of the FIFO; when the RDN is logic 1, a byte of data is read out onto DATAOUT (7:0) from the bottom of the FIFO 100. The so-called top of the FIFO means the position of the module that will be written with the data, while the so-called bottom of the FIFO means the position of the module that stores the data about to be read out.

In the FIFO 100 of FIG. 5, the read operations utilize the read pointers RP0, RP1, RP2, RP3 and the write operations utilize the write pointers WP0, WP1, WP2, WP3. WP0 and RP0 are associated with the module 0. In the same way, WP1 and RP1 are associated with the module 1, WP2 and RP2 are associated with the module 2, and WP3 and RP3 are associated with the module 3. At a given time, only one of the read pointers (RP0, RP1, RP2, RP3) has the state logic 1, all the rest are logic 0. The read pointer with the state logic 1 represents the bottom of the FIFO, from which the next read operation will read out the data byte. The write pointer with the state logic 1 represents the top of the FIFO, where the next write operation will write a data byte. At a given time only one of the write pointers (WP0, WP1, WP2, WP3) has the state logic 1 and the remainder are logic 0.

The write pointers are connected to each other using a ring architecture. The moment a write operation is completed, the write pointer will pass the value logic 1 on to the next module in the ring while itself becomes 0, as is illustrated by the sequence of WP0→WP1, WP1→WP2, WP2→WP3, WP3→WP0. In the same way, the read pointers are also structured as a ring whose operation is identical to that of the write pointers.

The control section 104 of the FIFO 100 generates a FULL signal and an EMPTY signal. When the bottom of the FIFO is at the same time the top of the FIFO, there are two possible situations, as indicated above. If the last action is a read operation, it means all the data in the FIFO have been read already, therefore, the FIFO is empty, and the EMPTY signal will be set to 1; otherwise, it will be set to 0. On the other hand, if the last action is a write operation, it means that the FIFO has now four sets of unread data stored in it, therefore, the FIFO is full and the FULL signal will be set to 1; otherwise, it will be set to 0. In order to distinguish between these situations, each FIFO module 0,1,2,3 has been assigned two flags: FULL* and EMPTY*. If in one of the four modules 0,1,2,3, FULL*=1, it indicates that this particular module has detected a full FIFO. Therefore, the whole FIFO 100 will indicate FULL=1. If in any of the four modules 0,1,2,3, EMPTY*=1, it indicates that this particular module has detected an empty FIFO. Therefore, the whole FIFO will indicate EMPTY=1.

In every module, the read pointer, the write pointer, EMPTY*, and FULL* are all formed as a flip-flop. At the start of operation, the FIFO 100 is set so that the initial state of the module 0 is RP0=1, WR0=1; EMPTY*=1 and FULL*=0 so that the FIFO as a whole indicates EMPTY=1 as well. All the rest of the flip-flops in the other modules are set to logic 0.

In addition to the modules 0,1,2,3, the FIFO 100 of FIG. 5 also includes some other logic components: 1C001, 1C002, which are NOR gates, have three functions: 1. when the FIFO is reset, WRN and RDN are disabled; 2. when the FIFO is in the state of EMPTY=21, the read operation is disabled so that it will read the same data that it did the previous time; 3. when the FIFO is in the state of FULL=1, the write operation is disabled so that additional data cannot be stored in the FIFO. The FIFO use non-overlap clocking. For example, 1C003 and 1C004 are used to produce the non-overlap clocking for reading and writing 20 operations. As indicated above, 1D001−1D008 (i.e., the inverters 117) are used to invert the phase of DATAIN (7:0). This is necessary because the storage element 114 invert each bit once during the process of input and output, so, to make the polarity identical between DATAIN (7:0) and DATAOUT (7:0), the polarity should be inverted first at DATAIN (7:0) When RESET=1, to set up the initial values of the FIFO, the module 0 has to be slightly different from the rest of the modules. When RESET=1, a logic 1 will be transmitted into the flip-flops 1C101, 1C102, and a logic 0 into flip-flops 1C201, 1C202, 1C301, 1C302, 1C401, and 1C402, so as to set up the read pointers (RP0=1, RP1=RP2=RP3=0) and the write pointers (WP0=1, WP1=WP2=WP3=0). In Module 0, because RP0=1, WP0=1, it makes possible 1C105=1C107=0, and 1C106=1C108=1, by which time signals can be latched into the flip-flops 1C103 and 1C104. The signals latched into flip-flops 1C103 and 1C104 are defined by 1C006=0, which makes 1C109(EMPTY*)=1 and 1C110(FULL*)=0. As to the rest of the modules, since RESET=1, it makes possible 1C205=1C207=1C305=1C307=1C405=1C407=0, 1C206=1C208=1C306=1C308=1C406=1C408=1, by which time signals can be latched into flip-flops 1C203, 1C204, 1C303, 1C304, 1C403, and 1C404. Also, since WP1=WP2=WP3=0, RP1=RP2=RP3=0, these signals result in EMPTY*(1C209, 1C309, 1C409)=0, and FULL*(1C210, 1C310, 1C410)=0. The initial value of the FIFO is thus set up.

As indicated above, the write pointers of every module are connected to each other in a ring architecture and so are the read pointers. WP0 is connected to the input terminal of flip-flop 1C201, while WP1 is connected to that of 1C301, WP2 to 1C401, and WP3 back to the input terminal of 1C101. The moment a write action is completed (1C007:0→1, 1C008:1→0), flip-flops 1C101, 1C201, 1C301 and 1C401 will latch the signals at their inputs. Also, since there is only one among WP0, WP1, WP2, AND WP3 that is set to logic 1, this logic 1 value will move to the next module after completion of a write operation. In the same way, after a read operation, the logic 1 read pointer signal is transmitted to the next module.

In a write operation, a module 0,1,2,3 with a write pointer set to logic 1 will latch the data online IN(7:0) into its corresponding memory unit 110,111,112,113. Assume WP1=1 and WP0=WP2=WP3=0. In the write operation, 1C008=1, which makes 1C220=1, 1C120=1C320=1C420=0, and opens 1D201, 1D211, 1D221, . . . 1D271, so that IN(7:0) is latched into the corresponding memory unit 111. Likewise, in the read operation, a module with a read pointer "1" will release the signals in its corresponding memory unit to DATAOUT(7:0).

In any one of the modules 0,1,2,3, when the write pointer makes a transition from 0→1, the value of FULL* can be obtained by latching the read pointer signal in this module. If at this time the read pointer is 1, then FULL*=1, indicating that the write pointer has moved around the FIFO and caught up with the read pointer, therefore, the FIFO is full. Take Module 1 for example. Assume RP1=1, WP1=0, WP0=1; when the write action is completed (the data have been written into Module 0), 1C007:0→1, 1C008:1→0; flip-flop 1C201 at this instant latches the value of WP0, then WP1=1, and 1C205:1→0, 1C206:0→1; flip-flop 1C203 latches the value of 1C208, then 1C210(FULL*)=1. When another read action is completed, the read pointer will move along, RP1=0, 1C211=1; when flip-flop 1C203 is reset, 1C210(FULL*)=0 and the FULL signal of the FIFO is thus resolved. The same performing steps with the same result are applicable in obtaining the value of EMPTY*(e.g., 1C209).

Finally, the above-identified embodiments of the invention are intended to be illustrative only. Numerous alternative embodiments may be devised by those skilled in the art without departing from the spirit and scope of the present invention.

I claim:
1. A first-in, first-out (FIFO) memory comprising
a plurality of modules connected in sequence, each module comprising a memory section for storing data and a control section,
the control section of each module comprising a first flip-flop for outputting a write pointer which when set enables the writing of data into the corresponding memory section, a second flip-flop for outputting a read pointer which when set enables the reading of data from the corresponding memory section, a third flip-flop for outputting a first flag for indicating that the FIFO is full, and a fourth flip-flop for outputting a second flag for indicating that the FIFO is empty,
the first flip-flop in each of said modules being connected in a ring so that the write pointers of said modules are set sequentially so that data is written into the memory section of said modules in sequence,
the second flip-flop in each of said modules being connected in a ring so that the read pointers of said modules are set sequentially so that data is read from said memory sections of said modules in sequence.

2. The first-in, first-out (FIFO) memory of claim 1 where the writing of data into said memory sections and the reading of data from said memory sections takes place asynchronously.

3. The first-in, first-out (FIFO) memory of claim 2 wherein the write pointer of only one module in said FIFO is set at any given time and wherein the read pointer of only one module in said FIFO is set at any given time.

4. The first-in, first-out (FIFO) memory of claim 1 wherein in a specific one of said modules said first flag is set indicating said FIFO is full when said write pointer of said specific modules undergoes a transition into the set state and said read pointer in said specific module is set.

5. The first-in, first-out (FIFO) memory of claim 4 wherein in said specific one of said modules said second flag is set indicating said FIFO is empty when said read pointer of said specific module undergoes a transition into the set state and said write pointer in said specific module is set.

6. A first-in, first-out (FIFO) memory comprising
a plurality of modules connected in sequence, each module comprising a memory section for storing data and a control section for controlling the writing of data into and the reading of data out of said memory section,
the control section of each module comprising:

means for generating a write pointer for enabling data to be written into the corresponding memory section and for generating a read pointer for enabling data to be read out of the corresponding memory section, the control sections of said modules being interconnected so that data is written into and read out of said memory sections of said modules in sequence, and means for determining if said FIFO is empty or full.

7. The first-in, first-out (FIFO) memory of claim 6 wherein the control section of each module comprises a first flip-flop for generating said write pointer and second flip-flop for generating said read pointer.

8. The first-in, first-out (FIFO) memory of claim 7 wherein the first flip-flops in each of said modules are connected in a ring.

9. The first-in, firsts-out (FIFO) memory of claim 8 wherein the second flip-flops in each of said modules are connected in a ring.

10. The first-in, first-out (FIFO) memory of claim 6 wherein said means in each module for determining if said FIFO is full or empty comprises means for setting a first flag indicating said FIFO is full if the read pointer is set to enable data to be read and said write pointer undergoes a transition in which said write pointer is set to enable data to be written.

11. The first-in, first-out (FIFO) memory of claim 10 wherein said determining means in each module further comprises means for setting a second flag indicating said FIFO is empty if the write pointer is set to enable data to be written and said read pointer undergoes a transition in which said read pointer is set to enable data to be read.

12. The first-in, first-out (FIFO) memory of claim 11 wherein said means for setting said first flag and means for setting said second flag comprises third and fourth flip-flops respectively.

13. In a first-in, first-out (FIFO) memory formed from a plurality of modules connected in sequence, a module comprising a memory section for storing data, and a control section for writing data into said memory section and for reading data out of said memory section, said control section comprising, a first flip-flop connected to a corresponding flip-flop in the preceding and succeeding modules in said sequence for occupying a first binary state when said memory section is enabled for the writing of data and otherwise a second binary state, a second flip-flop connected to a corresponding flip-flop in the preceding and succeeding modules in said sequence for occupying said first binary state when said memory section is enabled for the reading of data and otherwise said second binary state, a third flip-flop which is set to one of said binary states to indicate said FIFO is full when said second flip-flop is in said first binary state and said first flip-flop undergoes a transition from said second binary state to said first binary state, and a fourth flip-flop which is set to one of said binary states to indicate said FIFO is empty when said first flip-flop is in said first binary state and said second flip-flop undergoes a transition from said second binary state to said first binary state.

* * * * *